United States Patent [19]

Shu et al.

[11] Patent Number: 5,101,901

[45] Date of Patent: Apr. 7, 1992

[54] SAND CONTROL AGENT AND PROCESS

[75] Inventors: Paul Shu, Cranbury, N.J.; William P. Donlon; E. Thomas Strom, both of Dallas, Tex.

[73] Assignee: Mobil Oil Corporation, Fairfax, Va.

[21] Appl. No.: 622,587

[22] Filed: Dec. 3, 1990

[51] Int. Cl.$^5$ .............. E21B 33/13; E21B 43/04; E21B 43/12

[52] U.S. Cl. ................................ 166/276; 166/293; 166/300

[58] Field of Search .............. 166/276, 278, 292, 293, 166/300

[56] References Cited

U.S. PATENT DOCUMENTS

| | | | |
|---|---|---|---|
| 2,365,033 | 12/1944 | Williams | 166/276 |
| 3,175,611 | 3/1965 | Hower | 166/292 |
| 3,434,540 | 3/1969 | Stein | 166/250 |
| 3,593,796 | 7/1971 | Stainback et al. | 166/292 |
| 3,658,131 | 4/1972 | Biles | 166/292 |
| 3,708,013 | 1/1973 | Dismukes | 166/276 |
| 3,756,318 | 9/1973 | Stein et al. | 166/278 |
| 3,983,941 | 10/1976 | Fitch | 166/276 |
| 4,081,029 | 3/1978 | Holm | 166/292 |
| 4,521,136 | 6/1985 | Murphey | 166/292 |
| 4,945,991 | 8/1990 | Jones | 166/278 |

Primary Examiner—George A. Suchfield
Attorney, Agent, or Firm—Alexander J. McKillop; Charles J. Speciale; Charles A. Malone

[57] ABSTRACT

A method for forming a gravel pack in a washed-out interval is provided where a borehole penetrates an unconsolidated or loosely consolidated oil or gas reservoir which is likely to introduce substantial amounts of sand into the borehole. After perforating the borehole's casing at a washed-out interval of the formation, sand is introduced into the interval. Afterwards, an aqueous solution of potassium silicate is injected into said interval. Thereafter, an alcoholic solution of hydrated calcium chloride is injected into the interval. A permeability retaining calcium silicate cement is formed in the interval thereby making a gravel pack. Injection of the potassium silicate and hydrated calcium chloride solutions is continued until the porosity of the interval has been reduced by the calcium silicate cement to an extent sufficient to exclude formation fines and sand.

11 Claims, 1 Drawing Sheet

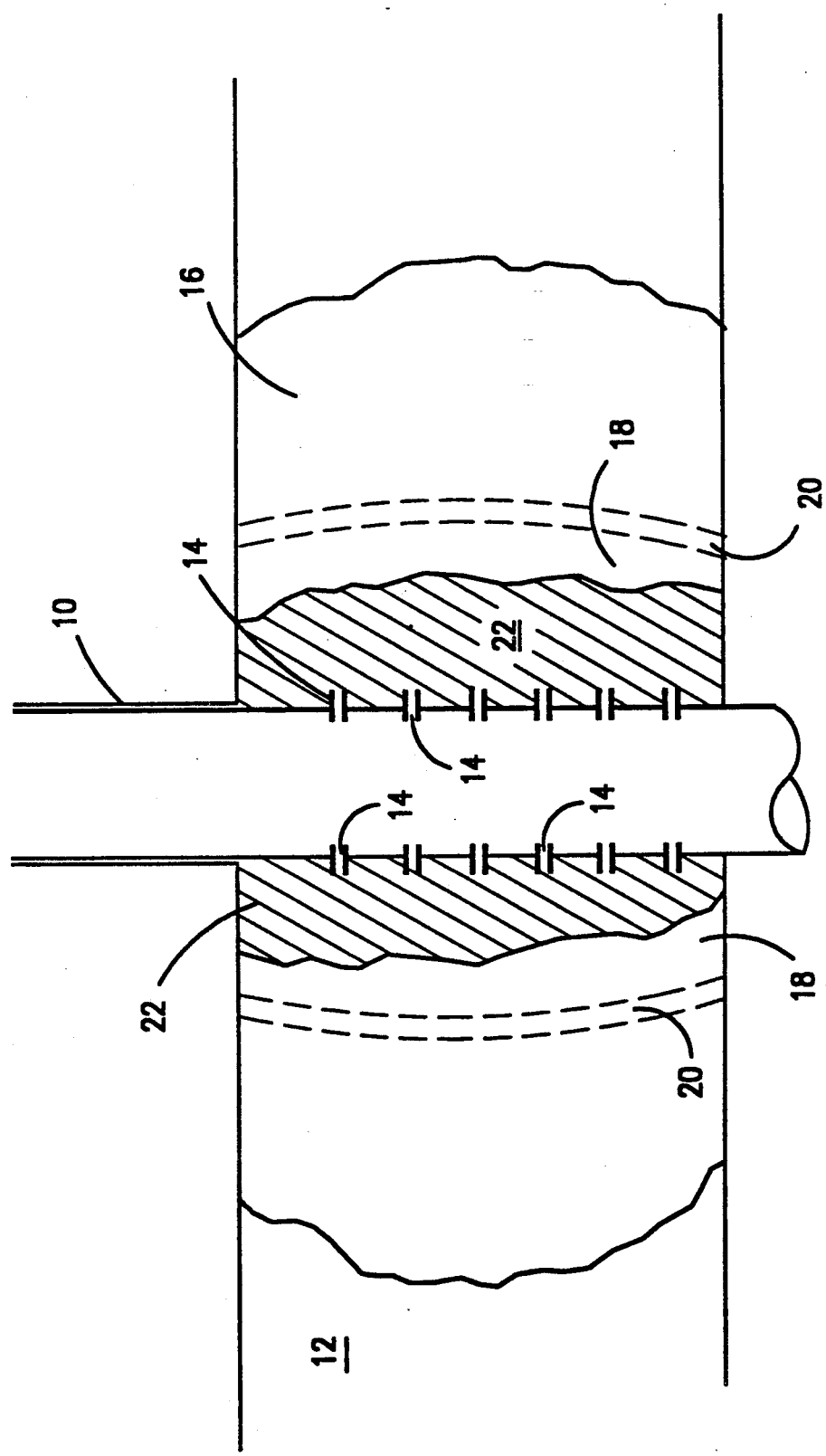

SAND CONTROL AGENT AND PROCESS

FIELD OF THE INVENTION

This invention relates to a method for gravel packing formations using calcium silicate cement in combination with a gravel pack operation to minimize formation damage and prevent fines migration.

BACKGROUND OF THE INVENTION

Sand consolidation and gravel packing are two near wellbore techniques widely used for controlling the production of sand from producing wells such as oil wells, gas wells and similar boreholes. In many instances, highly porous and fragmentable sand formations surround a wellbore. Under production conditions, the sand is often displaced from its aggregated structure and carried along by the fluid flood operations to a producing well. If the sand flow is allowed to proceed unchecked, the producing wellbore soon becomes full of sand, thereby clogging the wellbore and impeding oil production. Furthermore, sand arriving at the surface site of the well erodes the production hardware.

As more and more sand is displaced from its original formation, a region of wash-out cavities surrounding the wellbore region results. As the wash-out zones become more extensive, the integrity of the wellbore is threatened and a danger of the wellbore collapsing exists.

It has therefore been the subject of extensive and intense research by the petroleum industry to develop techniques to minimize or obviate displacement of sand particles into producing well areas and prevent the formation of wash-out cavities surrounding the wellbore. One such general approach suggested by the art is to consolidate the coarse sand structures prior to fluid production. Sand consolidation techniques are aimed at cementing loose sand structures adjacent a wellbore. Such consolidation is effective to prevent breakdown of sand formation and subsequent clogging of producing wells.

In many loosely consolidated or unconsolidated formations, it is not economically or practically feasible to consider sand consolidation techniques. Also, there are many instances where substantial wash-out cavities are either initially present naturally near the wellbore or washed-out cavities form around the wellbore after prolonged use despite previous attempts at sand consolidation.

For these conditions, gravel packing techniques are often used to prevent formation sand production or further erosion and to reestablish the integrity of the wellbore periphery. Gravel packing is a secondary sand consolidation technique involving the introduction of a fluid suspension of exogenous particulate matter downhole to fill the wash-out cavities or to "squeeze" to pack into the formation in the vicinity of the well. The term gravel is somewhat loosely applied in the art to encompass hard, rigid particulate matter ranging in size from a coarse sand to pebble size material.

Once the placement of sand and gravel has been accomplished, a slotted liner or "screen" placed as part of the production string helps hold the loose filling material and retards upstream sand flow through the filler material during production conditions.

Gravel packing can be accomplished by several accepted methods. One method is to place a gravel pack in the well adjacent the entire portion of the formation exposed to the well to form a gravel filter. In a cased perforated well, the gravel may be placed inside the casing adjacent the perforations to form an inside-the-casing gravel pack or may be placed outside the casing and adjacent the formation or may be placed both inside and outside the casing. Various such conventional gravel packing techniques are described in U.S. Pat. Nos. 3,434,540; 3,708,013; 3,756,318; and 3,983,941. These patents are incorporated by reference herein. Such conventional gravel packing techniques have generally been successful in controlling the flow of sand from the formation into the well. Sometimes, however, the gravel pack is unable to preclude fines migration which necessitates costly workovers to be initiated.

Therefore, what is needed is a method to prevent fines migration through a gravel pack so as to prevent costly workovers.

SUMMARY OF THE INVENTION

This invention is directed to a method for controlling sand production in an unconsolidated or loosely consolidated oil or hydrocarbonaceous fluid containing formation or reservoir which is penetrated by at least one wellbore. A gravel packing operation is conducted so as to prevent caving of a washed-out area around said wellbore. Once the gravel packing sand has been placed into the caved out area adjacent the wellbore in the formation, a calcium silicate cement is formed in-situ so as to reduce the permeability of the gravel pack sand while consolidating said pack and area substantially near the wellbore.

In the practice of this invention, an alkali metal silicate solution is injected into an interval of the formation containing the gravel pack sand. The alkali metal silicate enters the interval through perforations made in a cased well penetrating the formation. By increasing the viscosity of the silicate or by use of a mechanical packer, penetration of the fluid into the interval can be controlled. As the alkali metal silicate enters the interval, it saturates said interval.

After a desired volume of silicate has been placed into the interval requiring sand control, an alcoholic solution of hydrated calcium chloride is next injected into the interval. Upon coming into contact with the alkali metal silicate solution which has saturated the interval, calcium chloride reacts with the alkali metal silicate to form calcium silicate cement in-situ. The calcium silicate cement which is formed is stable at high pH's and temperatures in excess of about 400° F. These steps can be repeated until the permeability of the gravel pack sand has been reduced to the extent desired to control fines migration. Reduction of the permeability continues until a pore size is obtained which is sufficient to prevent formation fines or sands from migrating from the interval into the wellbore during the production of hydrocarbonaceous fluids. Thereafter, production is commenced and substantially fines free hydrocarbonaceous fluids are produced to the surface.

By controlling the strength and rate of injection of the alkali metal silicate and the calcium chloride which are injected into the interval being treated, the permeability, porosity and consolidation strength of the gravel pack sand and formation can be tailored as desired.

It is therefore an object of this invention to provide for an in-situ calcium silicate composition for reducing the permeability in an interval of a formation containing gravel pack sand so as to obtain a porosity sufficient to exclude fines and sand from produced hydrocarbonaceous fluids which composition is more natural to a formation's environment.

It is another object of this invention to provide for a composition which will ensure an even flow front, a homogeneous consolidation and uniform porosity so as to substantially exclude the entry of formation fines and sand into a wellbore from an interval treated with said composition.

It is yet another object of this invention to consolidate an unconsolidated or loosely consolidated interval in a formation containing gravel pack sand while obtaining a porosity sufficient to exclude formation fines or sand.

It is a still yet further object of this invention to provide for a method to obtain a desired porosity within an interval of a formation containing gravel pack sand which can be reversed by treating the interval with a strong acid.

It is an even still yet further object of this invention to provide for a formation consolidation and porosity reduction agent which is resistant to water, high temperatures and high pH's.

It is yet an even still further object of this invention to provide for a consolidation and porosity reducing composition lacking a particulate matter therein which matter might prevent penetration of the composition in an area requiring consolidation, flow alteration, or pore size reduction.

It is a still even yet further object of this invention to provide for a simple consolidation and porosity reducing composition and method which can tolerate water, residual oil and fines.

BRIEF DESCRIPTION OF THE DRAWING

The drawing is a schematic representation showing how the composition is injected into the formation so as to consolidate sand grains while maintaining the porosity of the formation.

DESCRIPTION OF THE PREFERRED EMBODIMENT

In the practice of this invention, sand preferably gravel packing sand, is directed into a washed out area adjacent to a wellbore that penetrates a hydrocarbonaceous fluid producing zone. The washed out area extends circumferentially from the wellbore into the formation which causes an increased possibility that the wellbore will collapse. Gravel is placed into the washed out area by directing sand through perforations in a casing until the washed out area is filled with the sand. A method which can be used for gravel packing a well is discussed in U.S. Pat. No. 4,945,991 which issued to Jones on Aug. 7, 1990. This patent is hereby incorporated by reference herein.

After the washed area has been packed by sand the sand is consolidated by forming a calcium silicate cement in-situ while a desired permeability is retained in the sand within the consolidated washed out area. Calcium silicate sand is formed within the washed out area until a desired porosity is obtained which is sufficient to preclude formation fines or sand from being produced to the surface along with hydrocarbonaceous fluids. As is known by those skilled in the art, core samples taken from the formation containing the washed out area can be used to determine the extent to which the porosity of the washed out area must be reduced to exclude formation fines or sand.

In order to form the calcium silicate cement, as shown in the drawing, an aqueous alkaline metal silicate slug 16 is injected into well 10 where it enters formation 12 via perforations 14. As the aqueous slug containing the alkaline metal silicate proceeds through formation 12, it saturates the formation. Afterwards, a second slug containing a solvent with a soluble calcium salt 18 mixed therein is injected into the formation whereupon it displaces the first aqueous plug. An interface 20 is formed between the aqueous phase 16 and calcium chloride 18. As the slugs meet, the alkali metal silicate and the calcium salt react simultaneously at the interface between the two slugs to form a silica cement. Since the two solvents, water and solvent, are miscible to form a single injection phase, a fairly even flow front is achieved. As interface 20 proceeds through formation 12, a cementing reaction takes place so as to bind sand grains in the formation thereby forming a consolidated porous zone 22. Although the sand grains are consolidated, a porous cement is formed which results in a substantially high retention of the formation's permeability. Retention of the formation's permeability allows calcium chloride phase 18 to move continually through the formation while cement is being formed at the interface.

Injection of the alkali-metal slug 16 and calcium chloride slug 18 containing the calcium salt can be continued until the porosity of the formation has been reduced to a size sufficient to exclude formation fines and sand. As will be understood by those skilled in the art, a pore size sufficient to exclude fines or sand is formation dependent and may vary from formation to formation. Core samples obtained from the interval to be treated can be tested to determine the required pore size. U.S. Pat. No. 4,549,608 which issued to Stowe et al. teaches a method of sand control where clay particles are stabilized along the face of a fracture. This patent is incorporated by reference herein.

Alkali metal silicates having a $SiO_2/M_2O$ molar ratio of about 0.5 to about 2 are suitable for forming an alkali stable silicate cement. The metal (M) which is utilized herein comprises sodium, potassium, lithium, or ammonium ions. Preferably, the $SiO_2/M_2O$ molar ratio is in the range of about 0.5 to about 1. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and more effective in permeability reduction due to higher contents of solids which form in the consolidated washed-out area The viscosity of the silicate solution can also determine the extent to which it will enter a washed-out interval of the formation to be treated. In those cases where it is not possible to control the viscosity of the silicate solution and preclude entry into a lower permeability zone, a mechanical packer may be used. The calcium silicate cement which is formed can withstand pH's greater than about 10 and temperatures in excess of about 500° F. The preferred silicates are sodium and potassium. Potassium is preferred over sodium silicate because of its lower viscosity. Fumed silica, colloidal silica, or other alkalines can be added to modify the $SiO_2/M_2O$ molar ratio of commercial silicate. Colloidal silicate can be used alone or suspended in the alkali metal silicate as a means of modifying silicate content, pH, and/or $SiO_2$ content.

The calcium salt which can be used herein is one which is soluble in alcohol. Calcium chloride hydrate is preferred. However, chelated calcium forms can also be used. Methanol and ethanol are the alcohols preferred for use herein. This is due to their high availability. Higher alcohols also can be utilized, as well as other solvents capable of dissolving calcium salts and chelates. Solvents such as ketones, tetrahydrofuran (THF), and dimethyl sulfoxide (DMSO) can be utilized. The concentration of calcium chloride hydrate should be in the range of about 10 to about 40 wt. percent, preferably 20 to about 30 wt. percent. Of course, enough calcium chloride solution should be used to complete the reaction with the alkali metal silicate.

In order to show the effectiveness of this method, consolidated sandpacks were prepared by mixing 40/60 mesh sand with appropriate amounts of potassium silicate solutions of various $SiO_2/K_2O$ molar ratios to a desired potassium silicate content. One pore volume of $CaCl_2 \cdot 2H_2O$, 30% in ethanol, was then flowed through the potassium silicate loaded sandpack to form consolidated sandpacks with reduced permeabilities. A typical non-consolidated 40/60 mesh sandpack has a permeability of 60 darcies. Resistance to alkali of these consolidated sand cores was tested in a 10% NaOH solution at 195° F. for 16 hours to observe the integrity of the cores. If a core remained intact, then its physical strength was tested by an ultrasonic generator at 120 watts output for five minutes under water. Core strength was evaluated by the weight of loose sand produced per unit core surface area exposed to ultrasound. Less sand is produced with a stronger core. The following examples show the effectiveness of the method.

| Example | $SiO_2/K_2O$ | Potassium Silicate Content, % | Sand Production $g/in^2$ | Darcy Permeability |
|---|---|---|---|---|
| 1 | 1.6 | 3 | 3.1 | 0.3–0.9 |
| 2 | 1 | 2.2 | 7.5 | 0.9 |
| 3 | 1 | 3.3 | 1.4 | 0.3–1.5 |
| 4 | 0.5 | 2.5 | 2.4 | NA |
| 5 | 0.5 | 3.75 | 1.1 | NA |

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

We claim:

1. A method for forming a gravel pack in a washed-out interval adjacent a borehole in an unconsolidated or loosely consolidated formation comprising:

a) perforating a cased borehole at an interval of the formation having a washed-out interval adjacent said borehole;
   b) placing sand into said washed-out interval via perforations in the borehole;
   c) injecting an aqueous solution of an alkali metal silicate into said interval through perforations contained in the borehole which solution is of a strength sufficient to react with an alcoholic solution of calcium salt to form a permeability retention cement having a porosity sufficient to exclude formation fines or sand; and
   d) injecting thereafter via the perforations a solvent containing a calcium salt into said interval containing sand in an amount sufficient to react with the alkali metal silicate at an interface with said solvent so as to form a calcium silicate cement which binds the sand whereupon the porosity of the sand-containing interval is reduced to a size sufficient to exclude the fines or sand while retaining the formation's permeability as said interface flows evenly and continually through said formation.

2. The method as recited in claim 1 where the alkali metal silicate is a member selected from the group consisting of ions of sodium, potassium, lithium, or ammonium and mixtures thereof.

3. The method as recited in claim 1 where the alkali metal silicate has a silicon dioxide to metal oxide molar ratio of about 0.5 to about 2.

4. The method as recited in claim 1 where said calcium salt is a member selected from the group consisting of calcium chloride hydrate, chelated calcium, or other calcium salts soluble in alcohol.

5. The method as recited in claim 1 where in step c) the solvent is a member selected from the group consisting of methanol, ethanol, higher alcohols, ketones, tetrahydrofuran, or dimethyl sulfoxide.

6. The method as recited in claim 1 where the silicate is contained in the solution in an amount of from about 10 to about 60 weight percent.

7. The method as recited in claim 1 where the calcium salt is contained in said solution in an amount of about 10 to about 40 weight percent.

8. The method as recited in claim 1 where steps b) and c) are repeated until the porosity of the interval has been reduced to the extend desired.

9. The method as recited in claim 1 where said calcium silicate withstands temperatures in excess of about 500 degrees F.

10. The method as recited in claim 1 where the calcium silicate withstands a temperature in excess of about 500 degrees F and a pH in excess of about 10.

11. The method as recited in claim 1 where the silicon dioxide to metal oxide molar ratio is less than about 2.

* * * * *